Patented May 15, 1951

2,553,433

UNITED STATES PATENT OFFICE 2,553,433

SYNTHESIS OF HYDROCARBONS

Hans G. Vesterdal, Elizabeth, N. J., assignor to Standard Oil Development Company, a corporation of Delaware No Drawing. Application May 29, 1947, Serial No. 751,445

6 Claims. (Cl. 260—449.6)

The present invention relates to the synthesis of hydrocarbons and oxygenated compounds having more than one carbon atom per molecule by the catalytic conversion of carbon oxides with hydrogen. More particularly, the invention is concerned with improved iron type catalysts for the conversion of carbon monoxide with hydrogen to form valuable hydrocarbons and oxygenated compounds.

The synthetic production of normally liquid hydrocarbons from gas mixtures containing various proportions of carbon monoxide and hydrogen is already known and numerous catalysts, normally containing an iron group metal, have been described which are specifically active in promoting the desired reactions at certain preferred operating conditions. For example, cobalt supported on an inert carrier is used when relatively low pressures (atmospheric to about 5 atmospheres) and low temperatures (about 375°–425° F.) are applied in the manufacture of a substantially saturated hydrocarbon product, while higher temperatures (about 450°–750° F.) and higher pressures (about 5–25 atmospheres and higher) are used in combination with iron-type catalysts to produce predominantly unsaturated products of high anti-knock value.

In both cases, the activity or utility of the catalyst declines steadily in the course of the strongly exothermic reaction chiefly due to the deposition of non-volatile conversion products such as carbon, paraffin wax and the like, on the catalyst. Various methods of preventing these changes in catalyst characteristics have been proposed. Most of these methods contemplate the removal of catalyst deposits after their formation, rather than the prevention of the deposits as such and operate efficiently and economically only to the extent to which catalyst deactivation is due to the deposition of high-molecular weight hydrocarbon products, such as paraffin wax.

The deterioration of iron-type catalyst, however, appears to be caused, to a substantial extent, by the deposition of fixed carbon or coke-like material formed by the dissociation and cracking of carbon monoxide and unstable hydrocarbons, which take place at the higher temperatures and pressures associated with the use of iron-base catalysts. If allowed to accumulate excessively, these carbon or coke deposits also adversely affect those characteristics of the catalyst which determine its utility as a fluidizable solid in processes employing the so-called fluid solids technique in which the reactants are contacted with a dense turbulent bed of finely divided catalyst fluidized by the gaseous reactants and reaction products.

More particularly, carbon and coke deposits have been found to cause rapid disintegration of the catalyst particles leading to a substantial and undesirable expansion of the fluidized bed and ultimately to the requirement of complete catalyst replacement because of fluidization difficulties. Catalyst broken down in this manner must be restored to a fluidizable particle size or is lost for further use. This phenomenon is observed even at carbon concentrations which do not substantially depress the activity and selectivity of the catalyst and which may not be prohibitive in fixed bed operation.

It has also been found that the various representatives of the iron-type catalyst group vary considerably in their performance in fluid operation. Thus, previous experience has shown that iron-type catalysts exhibiting the most desirable characteristics of high activity and selectivity to liquid products also have the strongest tendency toward carbonization and disintegration. These findings have even prompted generalizations to the effect that the higher the activity and liquid product selectivity of a synthesis catalyst the greater its carbonization and disintegration tendency in fluid operation. It will be appreciated, therefore, that the reconciliation of high liquid product yields with a low carbonization tendency of the catalyst presents a problem of greatest importance for fluid operation.

The present invention relates to an improved synthesis process and catalyst which permit a substantial reduction of the deposition of carbon or coke-like deposits on synthesis catalysts, particularly iron-type catalysts, combined with excellent yields of desirable liquid products.

It is, therefore, the principal object of the present invention to provide an improved process for the catalytic conversion of carbon monoxide and hydrogen.

Another object of my invention is to provide an improved catalyst for the hydrocarbon synthesis and a method of preparing the same.

A more specific object of my invention is to provide an improved hydrocarbon synthesis process operated by the fluid catalyst technique.

A further object of my invention is to provide an iron-type catalyst for the hydrocarbon synthesis which combines high activity and selectivity and long catalyst life with a substantial reduction of carbon formation.

A still more specific object of my invention is to provide an iron-type catalyst having improved utility for fluid catalyst operation.

Other and further objects and advantages will appear hereinafter.

In accordance with the present invention, these objects and advantages may be accomplished, quite generally, by combining iron-type synthesis catalysts with a hydrogenation catalyst which does not form a carbide in the presence of carbon monoxide, particularly at the conditions of the hydrocarbon synthesis. The preferred hydrogenation catalyst of the invention is copper chromite. Other hydrogenation catalysts useful for the purposes of the invention include tungsten oxide and platinum. The hydrogenation component may be present in proportions of up to about 50%, preferably up to about 20%, of the total catalyst weight. Suitable catalysts may have compositions falling within the ranges given below:

|  | Parts by weight |
|---|---|
| Metallic iron | 75–99 |
| Hydrogenation catalyst | 1–20 |
| Promoter | 0–5 |

While the conventional promoters for iron catalysts, such as various compounds of alkali metals or the oxides of chromium, zinc, aluminum, magnesium, manganese, the rare earth metals and others may be used, best results are obtained with potassium compounds, such as potassium halides, particularly potassium fluoride, potassium carbonate, potassium hydroxide, potassium phosphate, etc.

A typical method suitable for preparing iron catalysts in accordance with the present invention is illustrated by the following examples:

EXAMPLE I

Red iron oxide in the amount of 89 kg. is moistened and mixed thoroughly with 5 liters of an aqueous solution of $K_2CO_3$ containing 200 grams of $K_2CO_3$ per liter, i. e. a total of 1 kg. $K_2CO_3$. The mixture is dried in air at about 300° F. and the dried product is mixed thoroughly with 10 kg. of powdered copper chromite. The mixture so obtained is pilled and reduced in a stream of hydrogen at about 900° F. for about 4 hours at a hydrogen throughput of about 1,000 volumes of hydrogen per volume of catalyst per hour.

Instead of red iron oxide, other substantially pure iron oxides such as pyrites ash, magnetite, hematite, etc. may be used. The iron oxide may also be first mixed with the copper chromite and the mixture impregnated with potassium carbonate substantially as described.

A catalyst prepared in accordance with the above example was tested and compared with similar catalysts without the addition of copper chromite, in a fixed bed synthesis unit as summarized in the following example:

EXAMPLE II

*Synthesis conditions: 1/1 $H_2$/CO feed, 200 v./v./hr., 250 p. s. i. g. pressure*

| Catalyst | Temp., °F. | CO-Conversion, Per Cent | Yields, cc./m.³ of CO+$H_2$ Cons. | | Catalyst Age [1] | Carbon Selectivity, Per Cent |
|---|---|---|---|---|---|---|
|  |  |  | $C_4+$ | Alcohols |  |  |
| 90(99$Fe_2O_3$+1$K_2CO_3$)+10$CuCr_2O_3$ | 525 | 98.0 | 223 | 18 | 158 | 0.42 |
| 99$Fe_2O_3$+1$K_2CO_3$ | 610 | 95.5 | 210 | 18 | 120 | 0.50 |
| 99$Fe_2O_3$+1KF | 580 | 95.0 | 206 | 9.6 | 100 | 2.1 |

[1] Cu ft. of CO converted/lb. of catalyst.

From the above data it is evident that a considerable increase in activity and liquid product selectivity is obtained on adding copper chromite to the red $Fe_2O_3$-$K_2CO_3$ catalyst, making the catalyst of the invention the most active and selective of the catalysts tested. Thus, higher feed ratios may be employed for the same temperature of operation or lower temperatures for the same feed rate as shown above. Simultaneously, the carbon selectivity of the catalyst is significantly lower than that of the less active reference catalysts and amounts to only about ⅓ of that of the $Fe_2O_3$+KF catalyst. This combination of high activity, excellent selectivity and low carbon formation obtained with the iron-copper chromite catalyst is the outstanding characteristic of the catalysts of the present invention.

Catalysts suitable for fluid operation may be prepared in accordance with the present invention about as follows:

EXAMPLE III

A mixture of 89 kg. of red iron oxide or pyrites ash, magnetite, hematite or any other substantially pure iron oxide and 10 kg. copper chromite, classified separately to contain about 10% of 0 to 20 micron size particles, 60% of 20 to 80 micron size and 30% of 80+ micron size is moistened and mixed thoroughly with 5 liters of an aqueous solution of $K_2CO_3$ containing 200 grams $K_2CO_3$ per liter. The mixture is dried in air at about 300° F. The classification may also be carried out after the iron oxide and $CuCr_2O_4$ powders have been mixed and impregnated with the promoter. After breaking up any lumps present, the catalyst is charged to a fluid reactor, and may be used directly in the synthesis reaction, since this type of catalyst is easily activated by the synthesis gas. The catalyst may also be activated with hydrogen alone, however, by treatment with hydrogen at about 700° F. for 24 hours or at 900° F. or higher temperatures for a shorter time, for instance about 2 to 4 hours at 900° F. when employing pure hydrogen at a rate giving a linear velocity of about 0.5 feet per second.

A catalyst prepared in accordance with Example III may be employed in the hydrocarbon synthesis using the fluid catalyst technique at the conditions given below:

Operating conditions:

| | |
|---|---|
| Average catalyst temperature, °F | 600 |
| Pressure, p. s. i. g. | 400 |
| Feed rate, $H_2$+CO/hr./# Cat., standard cu. ft. | 15 |
| $H_2$/CO ratio in fresh feed | 2.0 |
| Vol. recycle/Vol. fresh feed | 2.0 |
| Superficial velocity at reactor inlet, ft./sec. | 0.55 |

Mol. % in Total Feed—

| | |
|---|---|
| $H_2$ | 43.8 |
| CO | 21.4 |
| $CO_2$ | 20.1 |
| Hydrocarbons (mainly $CH_4$) and nitrogen | 14.6 |

Results obtainable at these conditions may be about as follows:

| | |
|---|---|
| CO conversion, % | 99.1 |
| CO+$H_2$ conversion, % | 97.5 |
| Liquid yields, cc./m. $3H_2$+CO consumed— | |
| $C_4$+ | 222 |
| $C_3$+ | 261 |
| Water | 267 |
| Organic oxy compounds in water (calc. as $C_2H_5OH$) | 23 |

The used catalyst after 100 hours operation will contain about 8.5% carbon which is equivalent to about 0.28% of the CO reacted. Catalyst fines (0 to 20 micron material) normally will increase only from about 10% in the fresh catalyst to about 13% in the used catalyst without a material increase in catalyst bed volume or decrease in catalyst bed density.

When on the other hand, a conventional iron catalyst consisting, for example, of 94.21% $Fe_2O_3$, 2.59% $Al_2O_3$, 1.18% $SiO_2$, 1.80% $K_2O$ and 0.22% $Na_2O$ (Synthetic Ammonia Catalyst) is used at comparable reaction and fluidization conditions changes observed after 100 hours of operation include the following:

The carbon content of the catalyst has risen from close to 0 to over 30% by weight of iron which is equivalent to about .8 to 1% of the CO reacted, the proportion of catalyst fines of 0 to 20 micron size has increased by about 350% resulting in an increase of catalyst bed volume by about 250% and a decrease of catalyst bed density from about 55 lbs. per cu. ft. to about 14 lbs. per cu. ft. These changes necessitate a rapid catalyst replacement and a current readjustment of operating conditions.

While the foregoing description and exemplary operations have served to illustrate specific applications and results of my invention, other modifications obvious to those skilled in the art are within the scope of my invention. Only such limitations should be imposed on the invention as are indicated in the appended claims.

I claim:

1. An improved process for producing valuable conversion products from CO and $H_2$ in the presence of iron catalysts, which comprises contacting a gas containing CO and $H_2$ in synthesis proportions at synthesis conditions with a catalyst consisting essentially of a reduced mixture of a major proportion of an iron oxide, a minor proportion of copper chromite and a minor amount of an alkali metal compound promoter capable of increasing the selectivity of the catalyst for the synthesis reaction.

2. The process of claim 1 wherein said catalyst comprises about 75-99 parts by weight of iron, 1-20 parts by weight of copper chromite and 0-5% of said promoter.

3. An improved process for producing valuable conversion products from CO and $H_2$ in the presence of iron catalysts which comprises contacting a gas containing CO and $H_2$ in synthesis proportions at synthesis conditions with a fluidized mass of fluidizable catalyst particles consisting essentially of a reduced mixture of a major proportion of an iron oxide, a minor proportion of copper chromite, and a minor amount of an alkali metal compound promoter capable of increasing the selectivity of the catalyst for the synthesis reaction.

4. The process of claim 3 wherein said catalyst consists essentially of 75-99 parts by weight of iron, 1-20 parts by weight of copper chromite, and 0-5 parts by weight of a potassium compound capable of promoting the activity of the catalyst for the hydrocarbon synthesis.

5. The process of claim 3 wherein said catalyst is prepared by a method consisting essentially in preparing a fluidizable mixture of a major proportion of iron oxide particles of fluidizable size, a minor proportion of copper chromite, particles of fluidizable size, and a minor proportion of an alkali metal promoter, and reducing said mixture.

6. The process of claim 4 wherein said catalyst contains about 10% of copper chromite.

HANS G. VESTERDAL.

REFERENCES CITED

The following references are of record in the file of this patent:

UNITED STATES PATENTS

| Number | Name | Date |
|---|---|---|
| 1,148,570 | Bosch et al. | Aug. 3, 1915 |
| 1,801,382 | Wietzel et al. | Apr. 21, 1931 |
| 2,287,891 | Linckh | June 30, 1942 |
| 2,360,787 | Murphree | Oct. 17, 1944 |